United States Patent
Geddes et al.

(10) Patent No.: US 6,418,134 B1
(45) Date of Patent: Jul. 9, 2002

(54) FINITE IMPULSE RESPONSE FILTER FOR MULTI-CODE CDMA SIGNALS

(75) Inventors: Blaine Quentin Geddes, Kemptville; Wendy Wing Chi Cheung, Kanata, both of (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/188,659

(22) Filed: Nov. 9, 1998

(51) Int. Cl.[7] .............................................. H04B 7/216
(52) U.S. Cl. ...................................... 370/342; 370/441
(58) Field of Search ................................. 370/342, 320, 370/335, 441; 375/130–153

(56) References Cited

U.S. PATENT DOCUMENTS

| | | | | |
|---|---|---|---|---|
| 5,414,728 A | * | 5/1995 | Zehavi ........................ 370/206 |
| 6,108,375 A | * | 8/2000 | Farrokh et al. .............. 375/235 |
| 6,246,715 B1 | * | 6/2001 | Park et al. ................... 375/141 |
| 6,252,899 B1 | * | 6/2001 | Zhou et al. .................. 375/150 |
| 6,269,113 B1 | * | 7/2001 | Park ............................ 370/335 |

* cited by examiner

*Primary Examiner*—Salvatore Cangialosi
(74) *Attorney, Agent, or Firm*—Gibbons, Del Deo, Dolan, Griffinger & Vecchione

(57) ABSTRACT

Disclosed is a method and apparatus for filtering a plurality of CDMA signals. The signals are processed by a plurality of modulators. More specifically, the plurality of modulators performs orthogonal code and pseudonoise (PN) spreading on the plurality of CDMA signals, where the spreading produces a 1-bit in-phase (I) data stream and a 1-bit (Q) data stream. These streams are also processed by a plurality of filter the 1-bit I and 1-bit Q data streams and produce at least one n-bit wide I data stream and at least one n-bit wide Q data stream, where n is an integer of at least one.

The invention further includes a central processing unit for generating at least one gain factor. A processor is coupled to the filters and the central processing unit. The processor performs per channel power control and combining of the n-bit wide I data and n-bit wide Q data streams into one I stream and one Q stream using the gain factor generated by the central processing unit. A gain amplifier is also electrically coupled to the processor. The stream are sent to the gain amplifier for amplifying the output of the processor using the gain factor.

6 Claims, 4 Drawing Sheets

FINITE IMPULSE RESPONSE FILTER FOR MULTI-CODE CDMA SIGNALS

FIELD OF THE INVENTION

This invention relates generally to the field of wireless communications systems and more particularly, to apparatus and methods for modulating and filtering the signal in a mobile transmitter in a TR45.5 ITU-R code division multiple access (CDMA) system.

BACKGROUND OF THE INVENTION

Third generation mobile standards (TR45.5 ITU-R) for wireless communications improve upon second generation mobile standards by offering higher bit rate channels for data and voice communications. TR45.5 ITU-R proposes the use of four distinct channel types in the uplink. These are pilot, control, supplemental, and fundamental. Each of the four channel types is identified by a unique code which makes the channel signals orthogonal.

In a mobile communications system it is desirable to independently control the power of each of the channels according to their data rates such that a minimum bit error rate (BER) threshold is achieved at the receiving end. Exceeding the threshold would result in power wasted at the mobile station and excessive interference to other mobile stations in the system. Operating significantly below threshold results in either low effective throughput due to multiple repeated transmissions or a poor quality link due to data corruption.

Fundamental to digital communications systems with limited bandwidth is filtering the channel signals prior to transmission. This is performed to restrict the channel to the allocated bandwidth while minimizing intersymbol interference within the channel. Such filters are well known in digital communications. They are typically implemented in the digital domain as finite impulse response (FIR) filters. FIG. 1 shows a typical modulator structure including a power control 6, a spreader 5, and a filter 7. As shown, the filter 7 is at the last stage.

Each of the four channels referred to above consists of a one bit digital signal prior to modulation. To represent a range of power levels for a digital signal, more than the two levels of the signal will be required. For example, if a signal prior to power control 6 were represented as +1 and −1, and a coefficient quantized to eight bits were to represent the power level, the result would be a 512 state output signal where the signal amplitude could range from −1 to +1 in steps of 1/256. To filter a signal such as this would require greater complexity in the multipliers of the FIR filter since instead of consisting of a 1-bit by N-bit multiply, where N is the number of bits desired in the coefficients, the multipliers would consist of M×N multipliers, where M is the number of states in the input sample to the filter. This is significant in a digital hardware implementation of the filter because a multiplier's complexity will grow approximately linearly with expansion of the dynamic range of its input (assuming the coefficient dynamic range is fixed). In this case an M×N multiplier requires approximately M times greater complexity than a 1×N multiplier. Greater complexity results in larger hardware and may also result in more power consumption.

FIG. 2 shows a standard FIR filter. The $Z^{-n}$ blocks represent unit delays 200, where the cascaded string of unit delays 200 form a tapped delay line. In digital form this is a shift register with a bit width as required to store all of the bits of the input sample. The number of bits of each sample would be dictated by the dynamic range requirement of the system. This would be determined by the worst case signal to noise ratio requirements of the system and by taking into account whatever power control adjustment range is applied to the signal. The value of each tap of the delay line is multiplied (module 220) by its corresponding coefficient (Cn). The products of all the $Z^n \times Cn$ multiplications are then summed by a summation unit 230.

According to the TR45.5 ITU-R specification, the channel inputs can be only 1 bit. Conventional systems and methods do not take advantage of this element of the specification. Since the inputs can be only 1-bit, a multiplier output need have only two states. Thus, instead of having hardware multipliers 220, a simpler look-up table can be used. The concept of a lookup table is well known. However, current systems and methods do not provide for such efficient software or hardware that inputs a signal to each of the channel filters that is only 1 bit wide. Thus conventional systems do not minimize the gate complexity of the mobile component for the wireless communications system proposed in TR45.5 ITU-R. In fact, as described above, the implementation proposed in the TR45.5 ITU-R System Description Draft contemplates the application of channel power control prior to filtering. This results in a wide dynamic range signal at the input to the FIR filter which would require processing using multipliers of equivalent input dynamic range. While this solution can work, it requires very high gate complexity.

Accordingly, there exists a need for a system and method that decreases the gate complexity in a mobile transmitter by reducing the dynamic range of the signal at the input to the FIR filter in the modulator.

A need also exists for a system and method of FIR filtering the signal from a mobile transmitter that provides for adjusting filter coefficients while minimizing gate complexity.

Accordingly, it is an object of the present invention to provide systems and methods that decrease the gate complexity in a mobile transmitter by reducing the dynamic range of the signal at the input to the FIR filter.

It is another object of the present invention to provide systems and methods of FIR filtering the signal from a mobile transmitter that provides for adjusting filter coefficients while minimizing gate complexity.

SUMMARY OF THE INVENTION

In accordance with the teachings of the present invention, these and other objects may be accomplished by the present invention, which is a transmitter for modulating and filtering signals in a wireless communications system. The invention acts on a plurality of CDMA signals.

The signals are processed by a plurality of modulators. More specifically, the plurality of modulators performs orthogonal code and pseudonoise (PN) spreading on the plurality of CDMA signals, where the spreading produces a 1-bit in-phase (I) data stream and a 1-bit quadrature (Q) data stream. These streams are also processed by a plurality of filters electrically coupled to the modulators. The filters filter the 1-bit I and 1-bit Q data streams and produce at least one n-bit wide I data stream and at least one n-bit wide Q data stream, where n is an integer of at least one.

The invention further includes a central processing unit for generating at least one gain factor. A processor is coupled to the filters and the central processing unit. The processor performs per channel power control and combining of the n-bit wide I data streams and n-bit wide Q data streams into one I stream and one Q stream using the gain factor generated by the central processing unit. A gain amplifier is also electrically coupled to the processor. The streams are sent to the gain amplifier for amplifying the output of the processor using the gain factor.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DETAILED DESCRIPTION OF THE INVENTION

The invention consists of systems and methods for implementation in either an application-specific integrated circuit (ASIC), programmable gate array (PGA), microprocessor or the like, which perform modulation and filtering of signals in a multicode mobile transmitter. Efficiency is obtained by performing the per-channel power control function at the output of each of the channel filters, to allow the signal inputs to each of the channel filters to be only 1-bit wide. 1-bit wide channel filters enable look-up tables and adders to be used to avoid the complexity of hardware multipliers. This results in a substantially more compact circuit than one with a single filter and a power controlled signal at its input.

Figure 1:
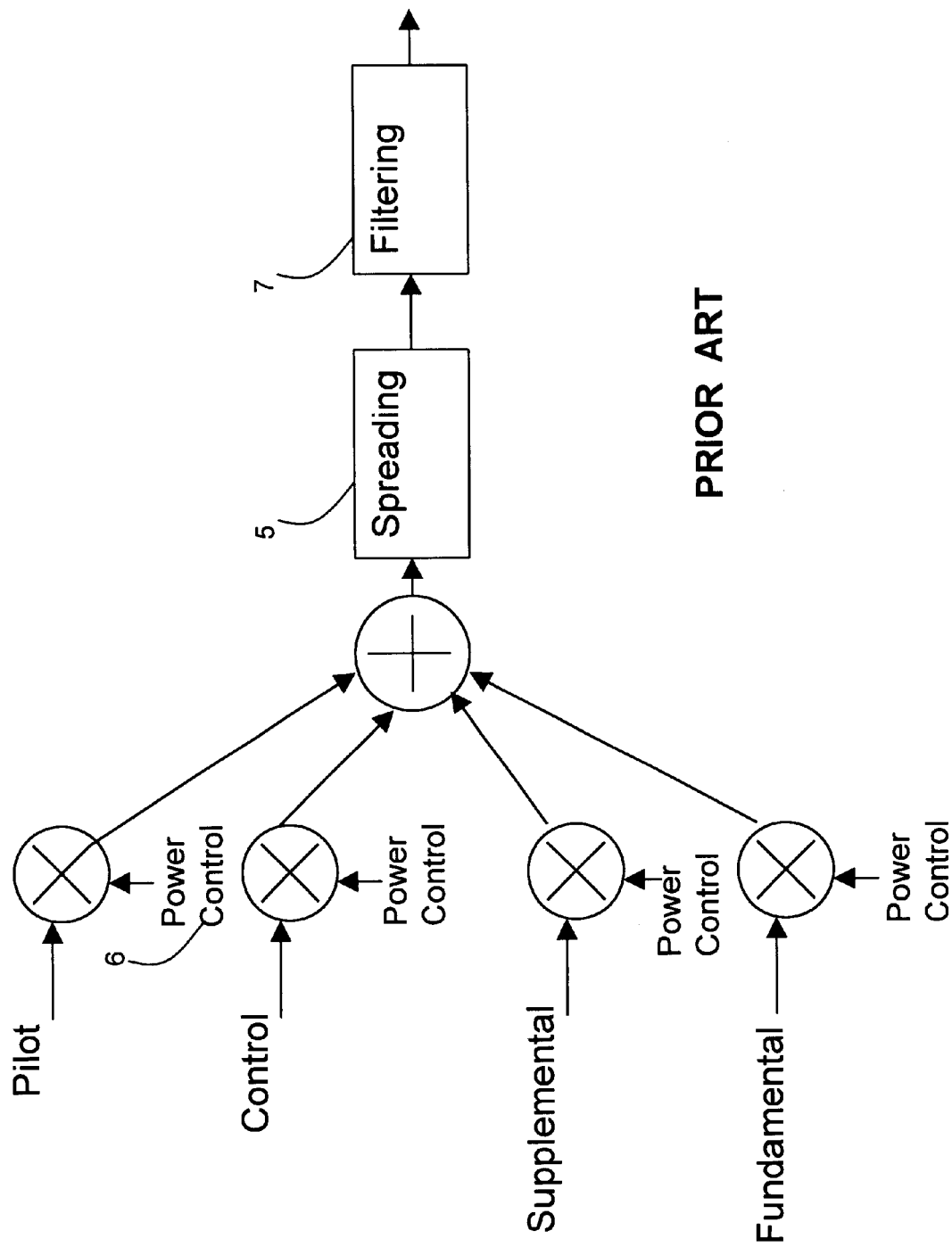
FIG. 1 depicts a prior art implementation of a modulator with code domain power control applied before filtering as suggested in TR45.5 ITU-R.
Figure 2:
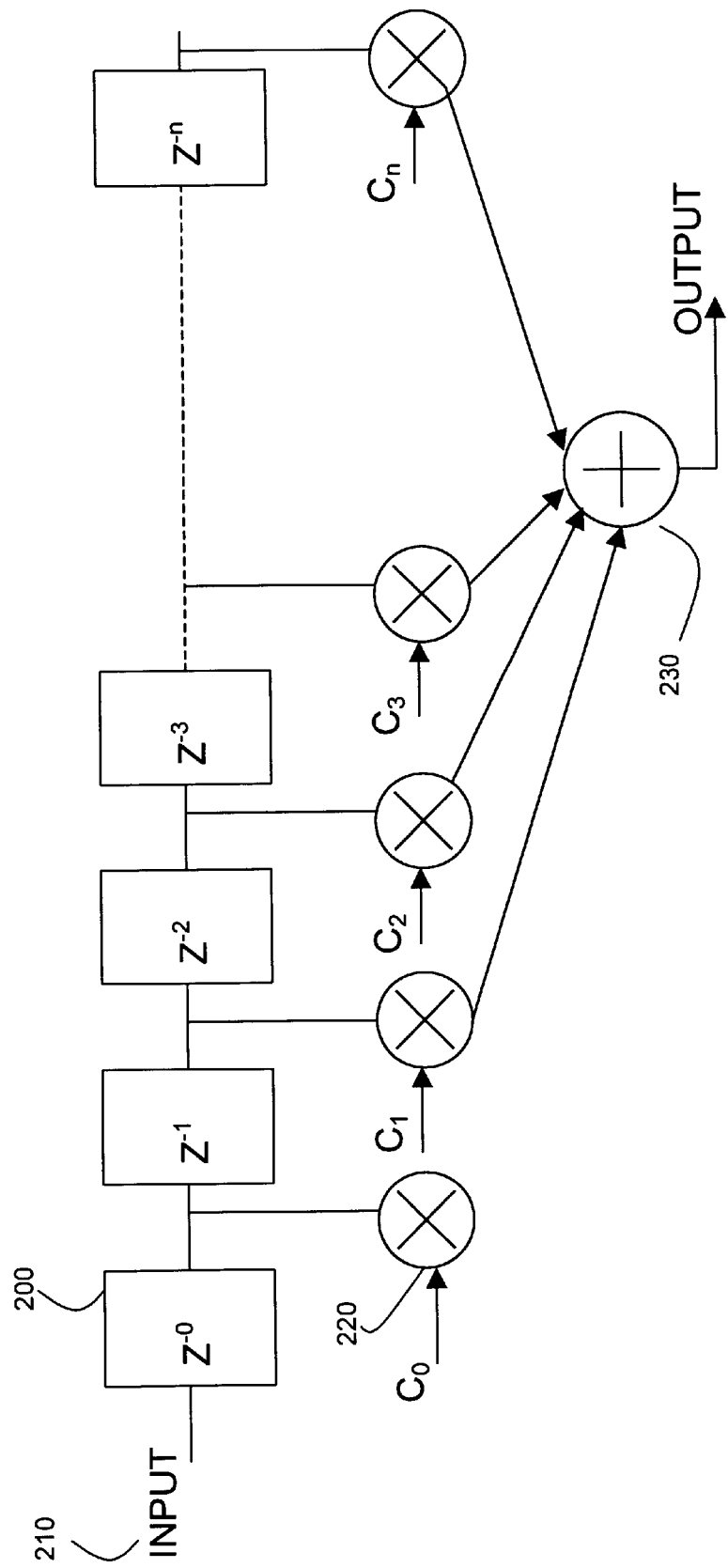
FIG. 2 depicts a prior art standard FIR filter.
Figure 3:
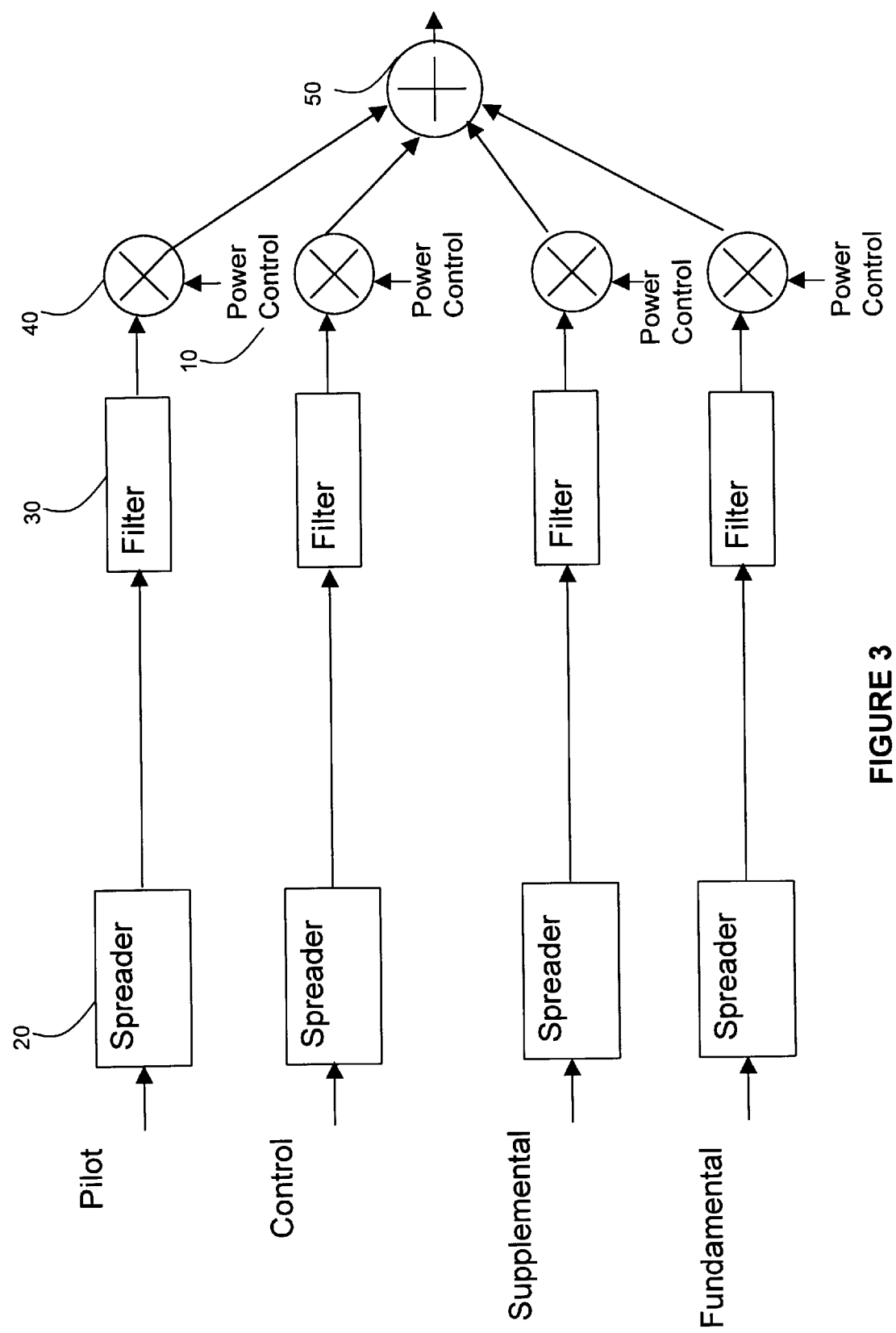
FIG. 3 depicts an embodiment of the modulator of the present invention, with code domain power control applied after filtering.

As FIG. 3 illustrates, per channel power control is performed after a spreader 20 and filter 30. Although more baseband filters 30 are required than in conventional systems, significant savings in complexity can be achieved by the present invention because the input to the baseband filter 30 is kept to 1-bit wide.

Figure 4:
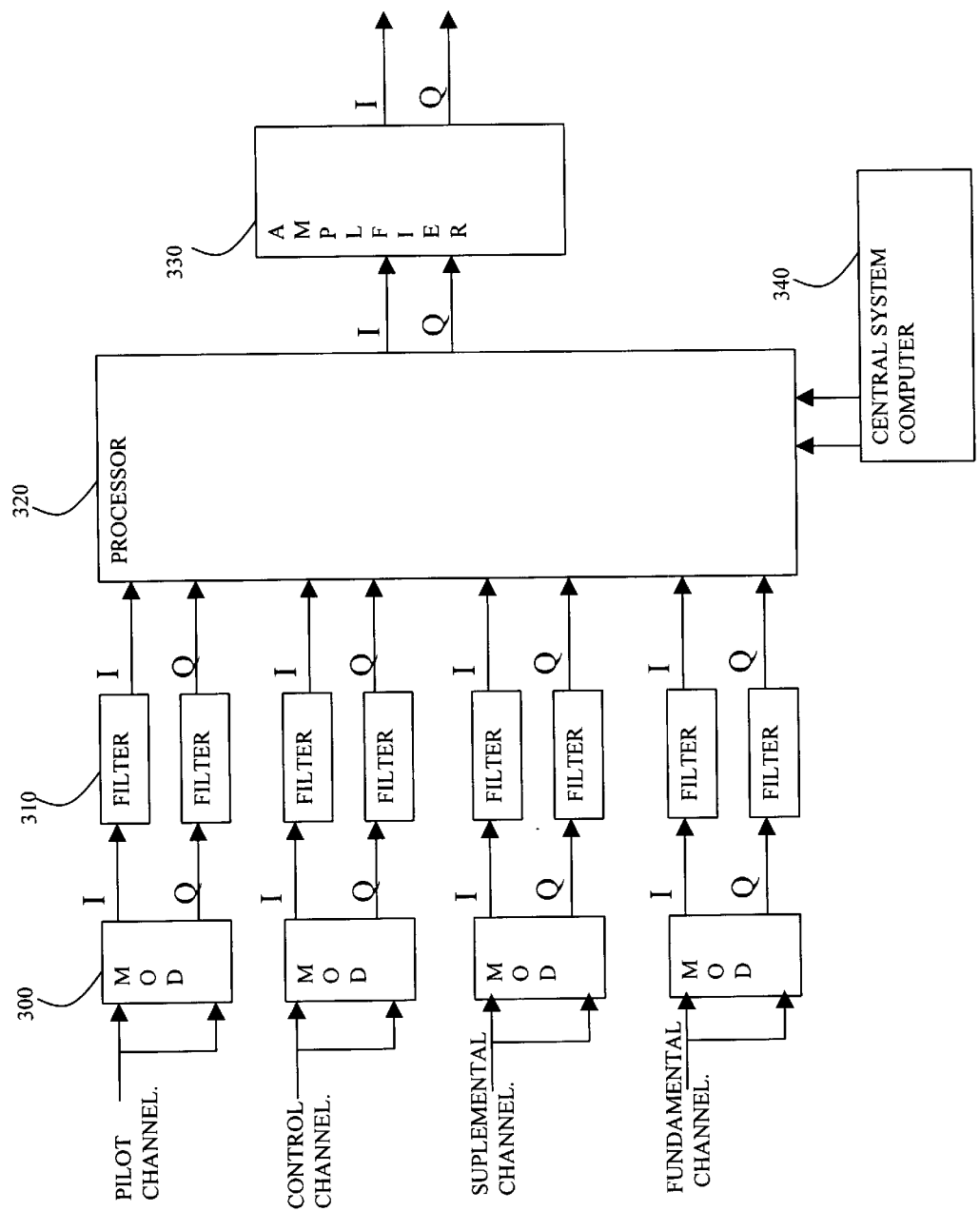
FIG. 4 depicts a more detailed embodiment of the modulator of the present invention, with code domain power control applied after filtering.

FIG. 4 illustrates the preferred embodiment of the present invention. This embodiment receives CDMA channels as specified in TR45.5 ITU-R. The apparatus includes modulators 300, where each modulator 300 is assigned to receive a CDMA channel. The input to each modulator is the 1-bit wide data from a channel. The modulator also performs orthogonal (e.g. Walsh, Gold, etc) spreading and pseudonoise code (PN) spreading as per the TR45.5 ITU-R specification. The output of the modulator is a pair of I and Q data streams where each stream is also 1-bit wide.

The preferred embodiment also includes baseband (FIR) filters 310. The filters are identical and perform the same low pass pulse shaping function to each I or Q 1-bit data stream. The FIR filter 310 takes the 1-bit wide I or Q data stream from a modulator as input and outputs an n-bit wide bandlimited, pulse-shaped I or Q data stream. An alternative embodiment of the baseband filter may perform additional out-of-band attenuation, and still be within the scope of the invention.

The filter 310 of each channel consists of a tapped delay line and lookup tables. The tapped delay line can be a shift register of 1 bit storage elements, e.g. flip-flops (as opposed to N bit wide registers). The data contained in the delay line is grouped in segments. Each segment is used to feed a look-up table which effectively points to the precomputed sum of products result for that filter section. The outputs of the look-up tables are multiplexed to a time-shared accumulator which produces the composite sum of products result for the filter.

To improve filter response, the suggested embodiment may increase the resolution of the filter coefficients which leads to a linear increase in the complexity of the FIR filter, whereas in the case of the conventional model, both the filter input and filter coefficients may increase in resolution which leads to a squared increase in the complexity of the FIR filter. In the preferred embodiment, the filters 310 utilize coefficients as specified in the TR45.5 ITU-R specification, but it is possible to use coefficients having more or less dynamic range.

The apparatus also consists of a processor 320. The processor 320 performs per channel power control and combining. The I and Q n-bit wide data from the baseband filters 310 are the processor's 320 input. The processor 320 takes the n-bit I and n-bit Q data and combines (e.g. multiplies) it with a corresponding channel gain. The corresponding channel gain is ascertained by the central system computer 340. The combining is implemented by taking the I data of the pilot channel, the I data of the control channel, the Q data of the supplemental channel and the Q data of the fundamental channel and combining them to form a single n-bit wide I data structure. The processor 320 also takes the Q data of the pilot channel, the Q data of the control channel, the I data of the supplemental channel and the I data of the fundamental channel to form a single n-bit wide Q data channel. Thus, the outputs are a pair of n-bit wide I and Q data streams. An alternative embodiment of the processor 320 can be simple multipliers, shifters and adders that may or may not be implemented in a time-shared fashion in ASIC, PGA, processor, or other logic device.

The per channel gains and overall channel gain are determined by a central system computer (CSC) 340. The CSC 340 also oversees the control and operation of the CDMA terminal transmitter unit (not shown). It obtains the per channel gain values based on methods in the TR45.5 ITU-R specifications or alternatively by determining the data rates of the input channels. The CSC 340 runs a power control algorithm to determine the overall channel gain. Look-up tables or memories may also be used to assist in determining per channel gain and overall channel gain. Once determined, the per channel gains are sent to the processor 320, and the overall gain is sent to the amplifier 330 for multiplication.

The amplifier 330 performs the overall power control of the combined data channels. It takes the n-bit wide I and Q data from the processor 320 as input and multiplies it with the overall channel gain mentioned above. The amplifier output is a pair of amplified n-bit wide I and Q data streams.

While FIG. 3 shows only four input channels, it is likely that future CDMA specifications will have more or less channels. The preferred embodiment can be easily adapted to comply with future CDMA specifications having more or less channels by simply adding more modulators and filters, and still be within the scope of the invention.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A transmitter for modulating and filtering a plurality of code division multiple access (CDMA) signals, comprising:

a plurality of modulators for performing orthogonal code and pseudonoise (PN) spreading on said plurality of CDMA signals, wherein said spreading produces a 1-bit in-phase (I) data stream and a 1-bit quadrature (Q) data stream;

a plurality of filters coupled to said modulators, for filtering said 1-bit I and 1-bit Q data streams and producing at least one n-bit wide I data stream and at least one n-bit wide Q data stream, wherein n is an integer of at least one;

a central processing unit for generating at least one gain factor;

a processor coupled to said filters and said central processing unit, for performing per channel power control and combining said at least one n-bit wide I data stream and said at least one n-bit wide Q data stream into one I stream and one Q stream using said at least one gain factor; and a gain amplifier electrically coupled to said processor, for amplifying the output of said processor using said at least one gain factor.

2. A transmitter according to claim 1, wherein said plurality of filters is one time shared filter.

3. A method for modulating and filtering code division multiple access (CDMA) signals in a transmitter, comprising:

performing orthogonal code and pseudonoise (PN) spreading on said plurality of CDMA channels, wherein said spreading produces a 1-bit in-phase (I) data stream and a 1-bit quadrature (Q) data stream using a plurality of modulators;

filtering said 1-bit I and 1-bit Q data streams and producing at least one n-bit wide I data stream and at least one n-bit wide Q data stream, wherein n is an integer of at least one, using a plurality of filters coupled to said modulators;

generating at least one gain factor using a central processing unit;

performing per channel power control and combining said at least one n-bit wide I data stream and said at least one n-bit wide Q data stream into one I stream and one Q stream using said at least one gain factor, using a processor coupled to said filters and said central processing unit; and amplifying the output of said processor using said at least one gain factor using a gain amplifier electrically coupled to said processor.

4. A method according to claim 3, wherein said filtering further comprises timesharing a filter.

5. An apparatus for modulating and filtering code division multiple access (CDMA) signals, comprising:

modulator means for performing orthogonal code and pseudonoise (PN) spreading on said plurality of CDMA signals, wherein said spreading produces a 1-bit in-phase (I) data stream and a 1-bit quadrature (Q) data stream;

filter means for filtering said 1-bit I and 1-bit Q data streams and producing at least one n-bit wide I data stream and at least one n-bit wide Q data stream, wherein n is an integer of at least one;

central processing unit means for generating at least one gain factor;

processor means for performing per channel power control and combining said at least one n-bit wide I data stream and said at least one n-bit wide Q data stream into one I stream and one Q stream using said at least one gain factor; and gain amplifier means for amplifying the output of said processor using said at least one gain factor.

6. An apparatus according to claim 5, wherein said filter means further comprises a means for timesharing a filter.

* * * * *